F. H. SOLOMON.
HINGED STEERING PILLAR.
APPLICATION FILED APR. 17, 1916.
1,230,528.
Patented June 19, 1917.
4 SHEETS—SHEET 2.
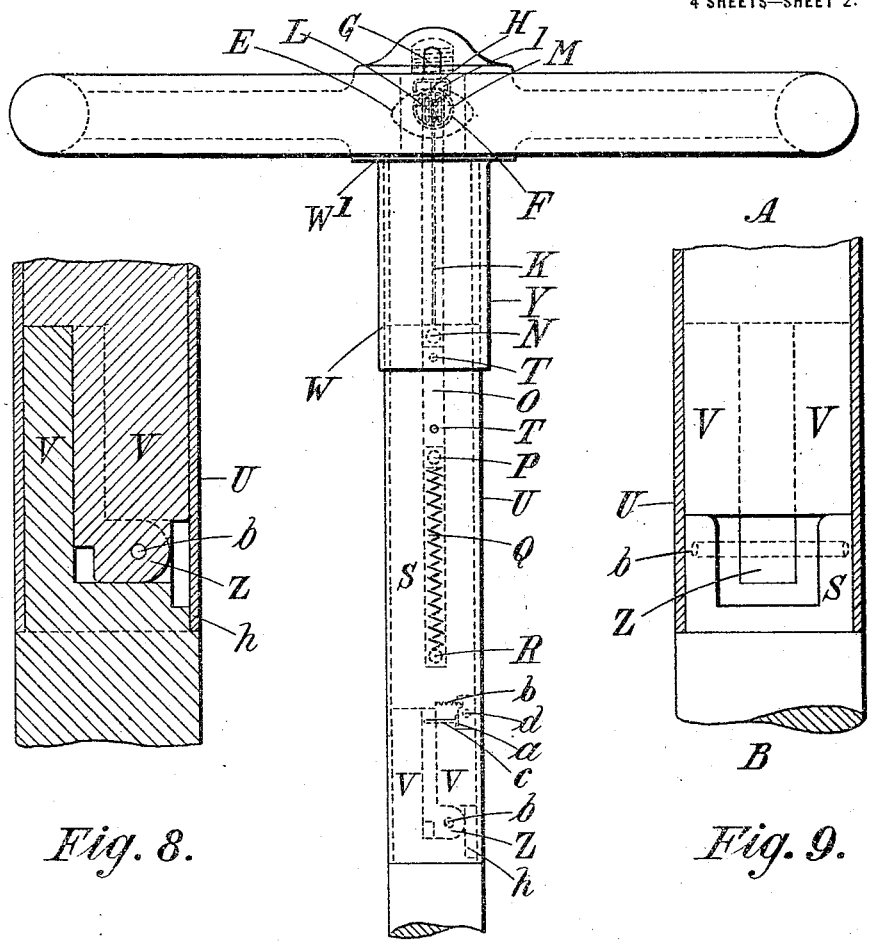
Fig. 8.
Fig. 9.
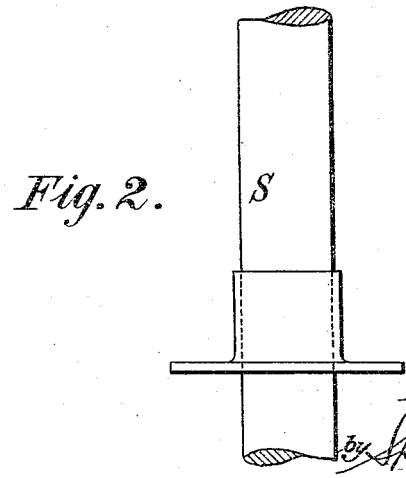
Fig. 2.
Inventor:
Frank H. Solomon,
by Spear Middleton Donaldson
& Spear Attys

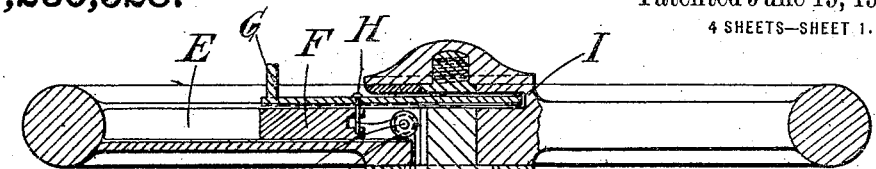

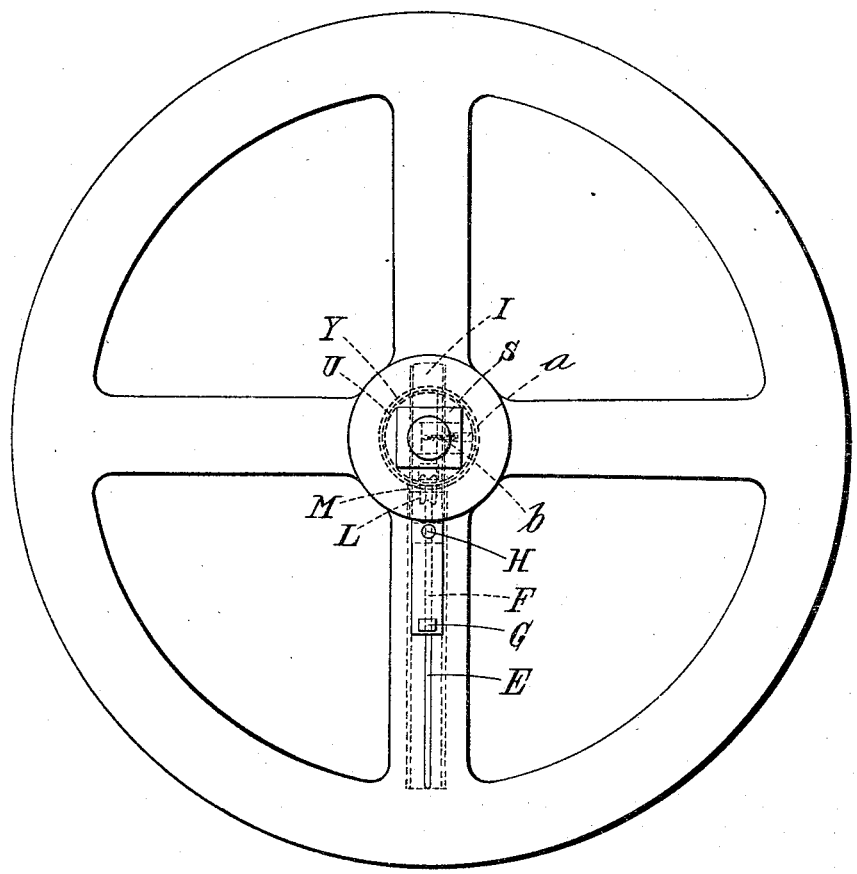

F. H. SOLOMON.
HINGED STEERING PILLAR.
APPLICATION FILED APR. 17, 1916.
1,230,528.
Patented June 19, 1917.
4 SHEETS—SHEET 4.
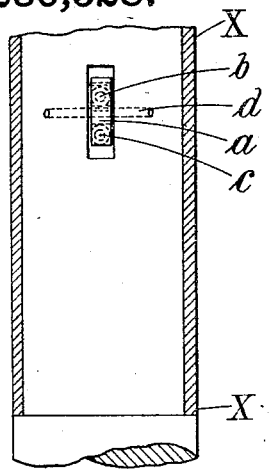
Fig.11.
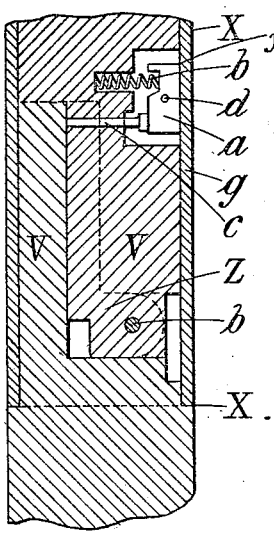
Fig.10.
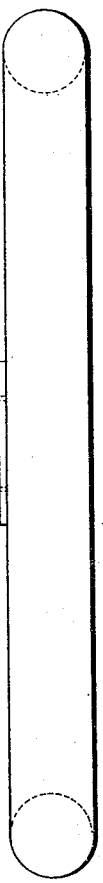
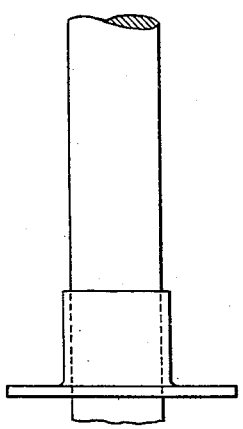
Fig.4.
Inventor:
Frank H. Solomon,
by Spear, Middleton, Donaldson & Spear
Atty's.

UNITED STATES PATENT OFFICE.

FRANK HARRY SOLOMON, OF PRETORIA, TRANSVAAL, SOUTH AFRICA.

HINGED STEERING-PILLAR.

1,230,528.  Specification of Letters Patent.  Patented June 19, 1917.

Application filed April 17, 1916. Serial No. 91,793.

*To all whom it may concern:*

Be it known that I, FRANK HARRY SOLOMON, a subject of the British Empire, residing at No. 8 Erasmus Buildings, Church Square, Pretoria, Transvaal Province, Union of South Africa, have invented new or Improved Hinged Steering-Pillars, of which the following is a specification.

This invention relates to improvements in hinged steering pillars for motor vehicles or the like. Such hinged steering pillars leave the driver of the vehicle more space in which to move, particularly when getting into or out of his seat, than is available with fixed steering pillars.

Referring to the accompanying drawings—

Figure 1 is a longitudinal section of a steering pillar and wheel embodying the invention;

Fig. 2 is an elevation of the same wheel and shaft at a right angle to Fig. 1;

Fig. 3 is a plan of the steering wheel;

Fig. 4 is an elevation of the steering pillar and wheel thrown over and away from the driver;

Figs. 5, 6 and 7 are respectively a transverse section, an elevation, and a longitudinal section, on an enlarged scale, of the hinge-releasing apparatus in one of the spokes of the steering wheel.

Fig. 8 is a section through the line A B in Fig. 9, showing the hinge on an enlarged scale.

Fig. 9 is a view at a right angle to Fig. 8;

Fig. 10 is a figure similar to Fig. 8 showing a latch device;

Fig. 11 is another view of the latch device at a right angle to Fig. 10.

Fig. 12 is an enlarged view of a guide block,

Fig. 13 is a modification of Fig. 1.

Similar reference letters refer to similar parts in all the figures.

Motor steering wheels are generally provided with spokes radiating to the circumference of the wheel, and according to this invention an existing convenient spoke is used or a spoke E is made sufficiently thick to allow of a groove being formed along its length to receive a sliding piece F consisting of a thumb piece G, pin H, and sliding or guiding piece I. By means of the thumb piece G this sliding piece F can easily be made to slide along the grooved spoke E. To the pin H is secured in a suitable manner one end of a steel tape, chain, or the like K, which passes over a pulley L suitably secured by means of a pin M to the grooved spoke, the other end of the steel tape K being suitably fastened to the upper end N of a guide block O, made of metal or other suitable material. To the lower end P of the guide block O is suitably affixed the upper end of a helical spring Q with its lower end R suitably affixed to the pillar S. This pillar is grooved to allow of the steel tape, guide-block, and spring, moving freely. The guide block O is suitably affixed by two or more small screws or pins T to an outer movable casing U made of any suitable material and surrounding the pillar S and hinge V. The casing extends from W to X when in locking or operative position and from $W^1$ to $X^1$ when in raised or unlocked position.

Y is an outer fixed casing of suitable material of sufficient diameter to allow the upper portion of the movable casing U to move freely and vertically within it.

V is the hinge consisting of a fixed jaw, and a movable jaw pivoted on a pin $l$.

A spring catch is provided comprising:

a. A latch block of suitable material and pivotally secured in the pillar by a pin $d$.

b. A small spring secured at one end in the pillar and at the other end to the upper portion of block $a$, and C. A pin movable within the pillar with its head resting against the block $a$ and its end when the hinge is locked resting against the vertical fixed jaw of the hinge piece.

The operation of unshipping the steering wheel when not in use is as follows:—By means of the thumb piece G the sliding piece F is easily slid along the grooved spoke E toward the circumference of the wheel, and in so doing draws the tape K over the pulley L thus extending the spring Q and lifting the guide-block O, and the casing U from its position X W to $X^1$ $W^1$. The hinge V is thus uncovered, and the steering wheel is then pushed forward. This releases the pin C which thus allows the spring $b$ to force the upper end of the latch block $a$ around its pivot $d$ outwardly from position $f$ $g$ to $f^1$ $g^1$ (Fig. 4); the point $f^1$ thus forming a latch which holds up the casing U and consequently also the spring Q, guide-block O, tape K, and sliding piece F, and prevents same from slipping back and into their operative positions.

When the hinge V is thus uncovered, the driver can push the wheel and upper portion of the pillar S away from him to a suitable position as in Fig. 4 and it is kept from falling lower by means of the construction of the hinge at $h$.

To restore the wheel to its operative position it is easily pulled by the driver toward the seat. When the jaws of the hinge are closed the end of pin C strikes the fixed jaw and is pushed outward and against the lower end of the latch block thus forcing it to return to its normal position $f$—$g$ and placing the spring $b$ again in compression, whereupon the casing S is drawn down by spring Q and locks the hinge in its operative position X W.

In Fig. 13 the lower portion of pillar $S^1$ revolves within an outer fixed casing $Y^1$ to allow of the petrol, spark air or other control levers, being affixed to such outer fixed casing $Y^1$ below the hinge V, whence they are operated by the driver.

What I claim as my invention and desire to secure by Letters Patent is:—

1. The combination of a hinged steering pillar, a casing adapted to surround and lock the hinge, a spring to retain the casing normally in locking position, a flexible member connected at one end to the casing, and an adjustable member adjacent the head of the pillar and connected to the other end of the said flexible member, for the purpose described.

2. The combination of a hinged steering pillar, a casing adapted to surround and lock the hinge, a longitudinal groove in the steering pillar, a block adapted to slide in said groove and connected to the casing, a spring tensioned in said groove and adapted to hold the casing normally in locking position, a steering wheel, a radial groove therein, a block slidable in said groove, a pulley intermediate the center of the wheel and the second mentioned block, a flexible member connected to the second mentioned block and passing over the pulley and connected to the first mentioned block, for the purpose described.

3. The combination of a hinged steering pillar, a casing adapted to surround and lock the hinge, a spring to retain the casing normally in locking position, a flexible member connected at one end to the casing, an adjustable member adjacent the head of the pillar and connected to the other end of the flexible member, a latch pivoted in the pillar above the hinge, a spring adapted to rock the latch outwardly and cause it to engage the lower edge of the casing when the latter is slid upward, a slidable pin in one member of the hinge and adapted when the hinge is closed to engage the other member of the hinge and be moved endwise and trip the latch thereby restoring the latter to normal position, for the purpose described.

Dated at Pretoria aforesaid the 22nd day of February 1916.

FRANK HARRY SOLOMON.

Witnesses:
 HENRY WALTER ADAMS,
 EASTON VICTOR ADAMS.

Copies of this patent may be obtained for five cents each, by addressing the "Commissioner of Patents, Washington, D. C."